(12) United States Patent
Momose

(10) Patent No.: US 9,001,265 B2
(45) Date of Patent: Apr. 7, 2015

(54) ILLUMINATION ASSEMBLY FOR A SCOUTING CAMERA

(71) Applicant: Non-Typical, Inc., De Pere, WI (US)

(72) Inventor: Jared Momose, Lewisberry, PA (US)

(73) Assignee: Non-Typical, Inc., De Pere, WI (US)

( * ) Notice: Subject to any disclaimer, the term of this patent is extended or adjusted under 35 U.S.C. 154(b) by 136 days.

(21) Appl. No.: 13/765,465

(22) Filed: Feb. 12, 2013

(65) Prior Publication Data

US 2014/0226059 A1 Aug. 14, 2014

(51) Int. Cl.
*H04N 5/222* (2006.01)
*H04N 5/225* (2006.01)

(52) U.S. Cl.
CPC ................................... *H04N 5/2256* (2013.01)

(58) Field of Classification Search
CPC .................................................... H04N 5/2256
USPC ............ 348/207.99, 371–372, 370, 374, 375, 348/376
See application file for complete search history.

(56) References Cited

U.S. PATENT DOCUMENTS

| 6,892,029 | B2 * | 5/2005 | Tsuchida et al. | 396/200 |
| 7,991,282 | B1 * | 8/2011 | McIntyre et al. | 396/205 |
| 8,482,263 | B2 * | 7/2013 | Barrade et al. | 320/166 |
| 2005/0135797 | A1 * | 6/2005 | Tsuchida et al. | 396/52 |
| 2012/0104962 | A1 | 5/2012 | Chen et al. | |

OTHER PUBLICATIONS

Linear Technology Corporation, LT 3956—80Vin 80Vout Constant-Current, Constant-Voltage Converter, data sheet, May 2010, 20 pages, Milpitas, CA.

* cited by examiner

*Primary Examiner* — Ahmed A Berhan
(74) *Attorney, Agent, or Firm* — Michael Best & Friedrich LLP

(57) ABSTRACT

This document discloses a camera assembly and a method for driving an illumination assembly of the camera assembly. The camera assembly comprises a digital camera, a power source including a battery and a super capacitor, and an illumination element powered by the power source. A first converter (e.g., a DC/DC SEPIC converter) charges the super capacitor from the battery and a second converter (e.g., a DC/DC boost converter) has a voltage input connected to the power source and a voltage output connected to the illumination element. A controller is programmed to control whether the illumination element is powered by the battery, the super capacitor, or both. The super capacitor is used to drive the illumination assembly at a high power level (e.g., when taking a still image), and the battery is used to drive the illumination assembly at a low power level (e.g., when taking a video).

7 Claims, 4 Drawing Sheets

ILLUMINATION ASSEMBLY FOR A SCOUTING CAMERA

BACKGROUND

The present invention relates generally to scouting cameras, which are cameras used to capture activity in a remote location without the presence of a user. More specifically, the invention relates to flash electronics for such scouting cameras.

Scouting cameras are often used by hunters to determine the amount of animal activity at a remote location. In order to monitor activity in dark conditions, scouting cameras are often equipped with an illumination assembly having illumination elements (e.g., xenon bulbs or LEDs). These illumination elements can be used to provide a flash (e.g., when taking a picture) or sustained illumination (e.g., when taking a video).

Because they are commonly used in remote locations, scouting cameras typically utilize batteries to power the camera and illumination assembly. Commonly available batteries, such as lithium ion (Li-ion) or alkaline batteries, often used in such an application are limited in their voltage capacities and are often incapable of withstanding the high current requirements for driving the illumination assembly. In addition, the battery life is reduced when the batteries are subjected to large spikes in current drawn in order to provide a high power flash.

When using a motion-activated scouting camera, it is often necessary to provide an initial high power flash to achieve a quality photograph followed by a subsequent low power illumination for taking video. In these situations, the batteries frequently are not able to source the current needed for the initial high power flash, and the variations, or spikes, in the current drawn from the battery reduces the life of the battery.

SUMMARY

The present invention provides a camera assembly and a method for driving an illumination assembly of a camera. The camera assembly comprises a digital camera (e.g., a motion-activated scouting camera), a power source including a battery and a super capacitor, and an illumination element (e.g., an LED) powered by the power source. A first converter (e.g., a DC/DC SEPIC converter) is operable to charge the super capacitor from the battery and has a voltage input connected to the battery and a voltage output connected to the super capacitor. A second converter (e.g., a DC/DC boost converter) has a voltage input connected to the power source and a voltage output connected to the illumination element. The camera assembly further includes a controller programmed to control whether the illumination element is powered by the battery, the super capacitor, or both, and further programmed to control the first converter and the second converter. In one embodiment, the controller measures the voltage of the super capacitor as feedback to control the first converter. Preferably, the power source further includes a load switch controllable by the controller to selectively connect the battery or super capacitor to the second converter.

The method comprises providing a camera assembly as broadly described above, charging the super capacitor with the battery, driving the illumination assembly at a high power level using the super capacitor, and driving the illumination assembly at a low power level using the battery. In one embodiment, the camera is capable of taking photographs and video. In this embodiment, driving the illumination assembly at a high power level is performed substantially simultaneously with taking a still photograph by the camera, and driving the illumination assembly at a low power level is performed substantially simultaneously with taking a video by the camera. When both still images and video are desired, driving the illumination assembly at a high power level is performed immediately before driving the illumination assembly at a low power level. Preferably, charging the super capacitor includes passing a current from the battery through a DC/DC SEPIC converter (e.g., using the super capacitor voltage as feedback to control the DC/DC SEPIC converter).

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
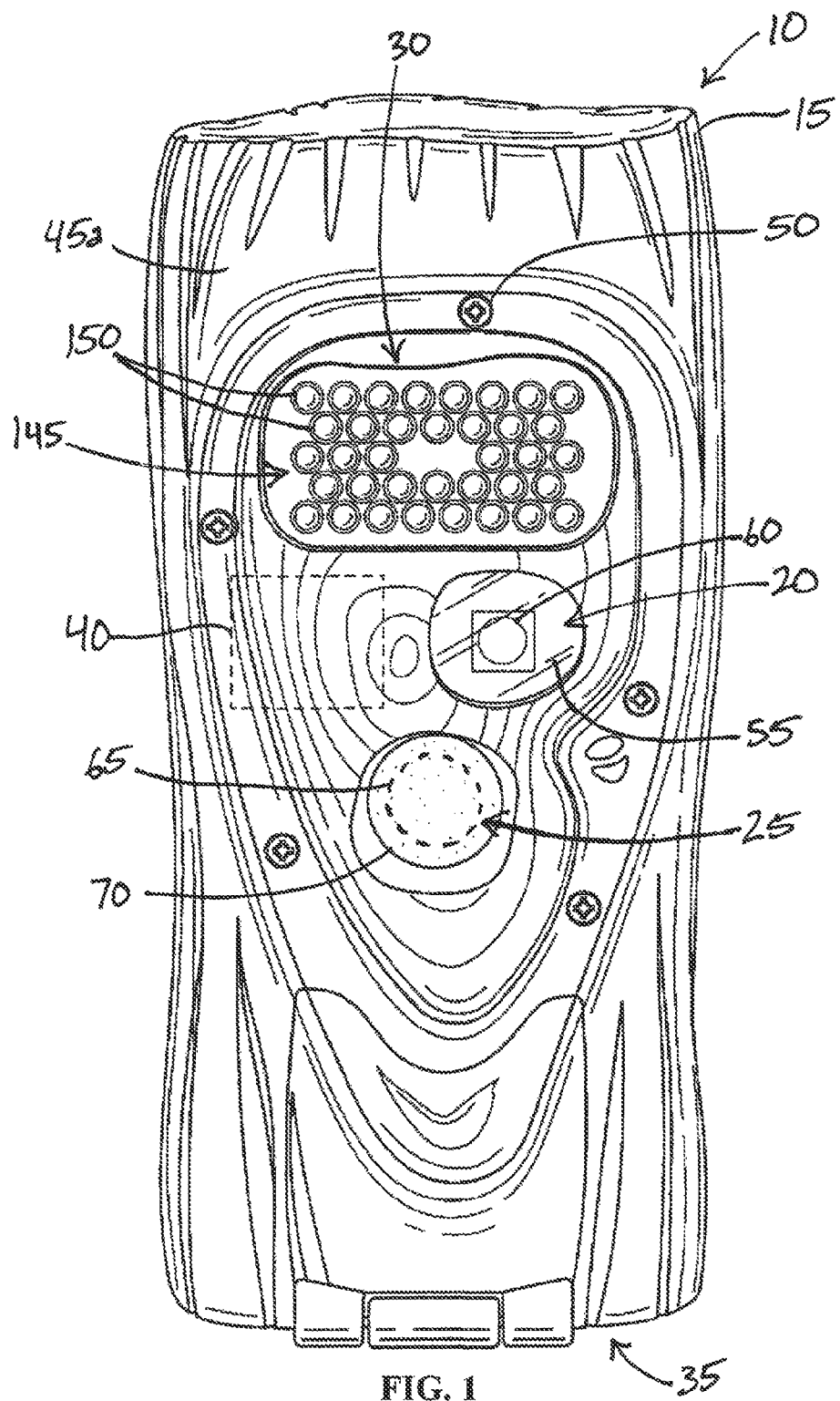
FIG. 1 is a front view of a scouting camera assembly including a camera and an illumination assembly and circuit assembly embodying the invention.
Figure 2:
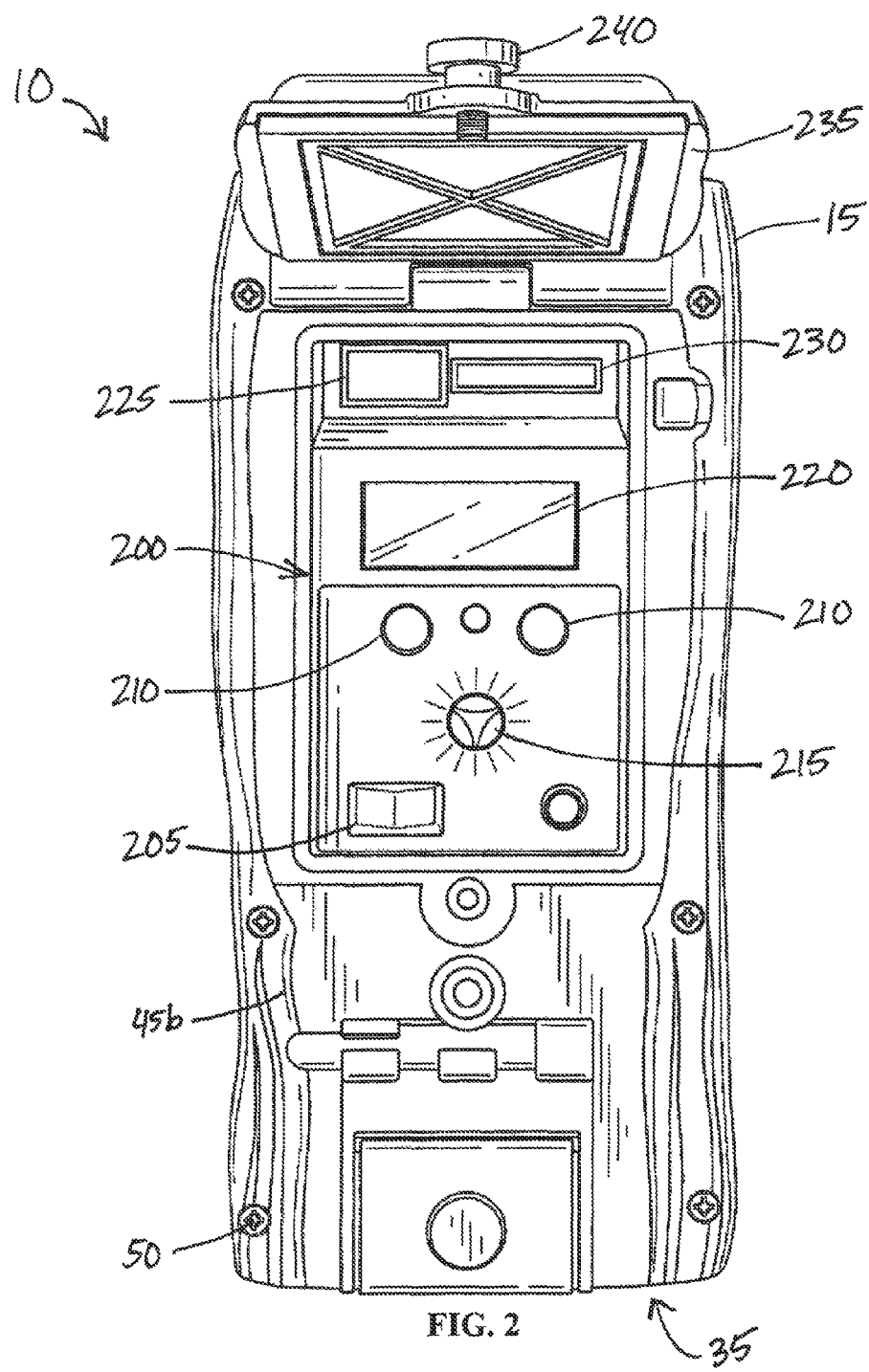
FIG. 2 is a rear view of the camera assembly of FIG. 1.
Figure 3:
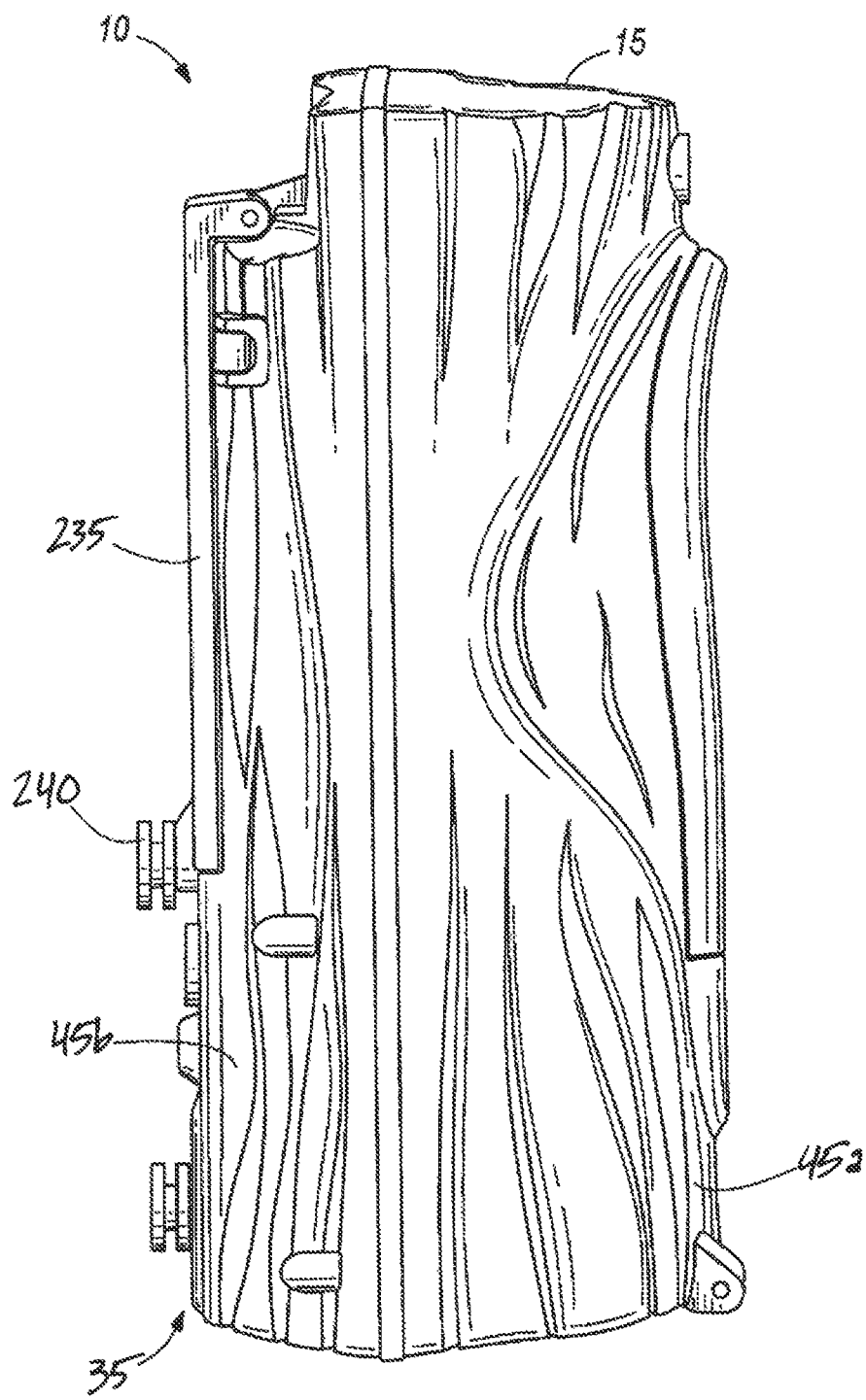
FIG. 3 is a side view of the camera assembly of FIG. 1.

FIGS. 1-3 illustrate a wildlife surveillance system, or camera assembly 10 that can be attached to a mounting structure (e.g., a tree, a post, etc.). The camera assembly 10 includes a housing 15 that supports a camera 20, a detector 25, an illumination assembly 30, a power module 35, and a control unit 40 for taking pictures and/or video (described collectively as media) of subjects (e.g., wildlife). As shown in FIG. 3, the illustrated housing 15 is defined by split-housing portions 45a, 45b, that are attached to each other (e.g., using fasteners 50 or adhesive) to enclose the camera 20, the detector 25, the illumination assembly 30, the power module 35, the control unit 40, and other components of the camera assembly 10. With reference to FIG. 1, the housing 15 has transparent windows 55 so that the camera 20, the illumination assembly 30, and the detector 25 are protected from the environment while also providing exposure (i.e., a clear line of sight) for the camera 20, the illumination assembly 30, and the detector 25.

The camera 20 includes an image-capturing device 60 (e.g., a digital receiver) that has a still image mode, for obtaining still images of subjects, and a video image mode for obtaining video images of subjects. In some constructions, the camera 20 also can include a hybrid or multi-image mode for obtaining still and video images of subjects (e.g., consecutively or at timed intervals). Each of the still image mode, the video image mode, and the hybrid image mode defines an operating parameter of the camera 20 that impacts how the subject is illuminated, as described in detail below.

The illustrated detector 25 includes a sensor, such as a passive infrared ("PIR") sensor 65, and a lens 70 (e.g., a Fresnel lens). The sensor 65 detects a subject and outputs a signal to the control unit 40 in response to detection of the subject. The lens 70 defines a field of view of the detector 25 and focuses the subject in the field of view onto the sensor 65.

Figure 4:
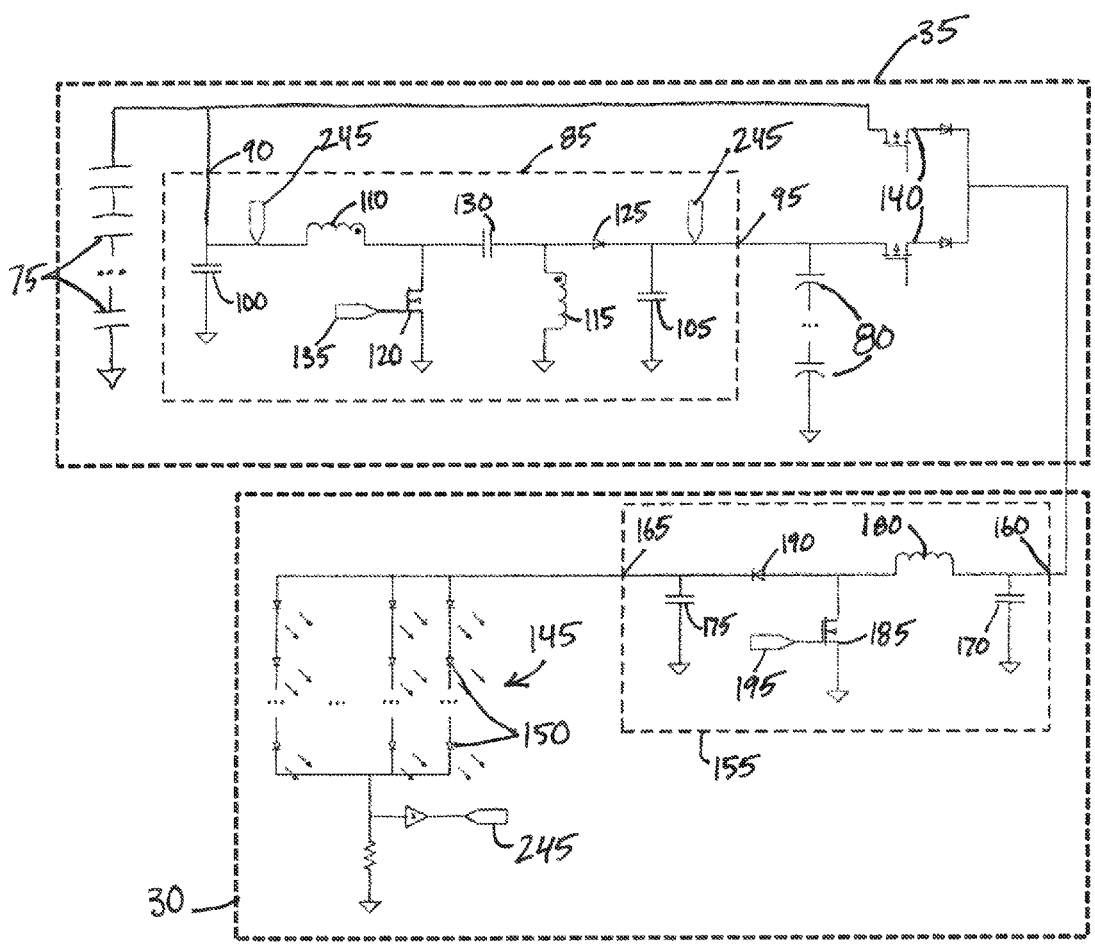
FIG. 4 is a schematic view of an electric circuit utilized in the camera assembly of FIG. 1.

The power module 35 is provided to power components of the camera assembly 10 and to facilitate downloading media stored in the camera 20. With reference to FIG. 4, the power module 35 includes at least one battery 75 (e.g., a lithium-ion battery, an alkaline battery, etc.) provided in series or parallel when multiple batteries are present. Many configurations of batteries or battery packs are contemplated, including eight AA battery cells configured as two strings of four cells. The power module 35 further includes a least one electrical double-layer capacitor, or super-capacitor 80. Super-capacitors, also known as ultra-capacitors or electric double layer capacitors ("EDLC"), have capacitance values that were previously unavailable in a single conventional capacitor, and super-capacitors are able to provide relatively high current pulses when compared to conventional capacitors or batteries. The illustrated super-capacitors 80 are provided and arranged in series. The stored energy in the batteries 75 can be transferred to the super-capacitors 80 by the use of a first DC/DC converter in the form of a single-ended primary inductance converter ("SEPIC") 85. The SEPIC converter 85 has a voltage input 90 and a voltage output 95, although it will be appreciated that any DC/DC converter with a modulation index (i.e. the ratio of output voltage to input voltage) ranging from zero to greater than one can be utilized. The SEPIC converter 85 is operable to either decrease or increase the value of the input voltage 90 at the output 95. The components of the SEPIC converter 85 are well known to one with ordinary skill in the art and include an input capacitor 100, an output capacitor 105, an input inductor 110, an output inductor 115, a first switch 120 (e.g., a MOSFET), a second switch 125 (e.g., a diode), and a middle capacitor 130. The input capacitor 100 is coupled in parallel to the batteries 75 such that the SEPIC converter input 90 is substantially equivalent at steady state to the battery 75 voltage. The MOSFET 120 is controllable via a gate signal input 135 provided by the control unit 40. The output capacitor 105 is coupled in parallel to the super-capacitors 80 such that the SEPIC converter output 95 is substantially equivalent at steady state to the super-capacitor 80 voltage. The power module 35 further includes load switches 140 separating the batteries 75 and the super-capacitors 80 from the illumination assembly 30. The load switches 140 are controllable to selectively connect the batteries 75, the super-capacitors 80, both, or neither to the illumination assembly 30.

The illumination assembly 30 is capable of illuminating a subject in at least two power levels of illuminating light when the camera 20 is capturing media. With reference to FIG. 1, the illustrated illumination assembly 30 includes a light source 145 that has illumination elements 150 (e.g., light emitting diodes "LEDs"). The light source 145 includes multiple LEDs 150 electrically connectable in a plurality of configurations. The illustrated light source 145 includes a plurality of LEDs coupled in series to form a string, with a plurality of strings coupled in parallel. The light source 145 is electrically connected to the power module 35 through the use of a second DC/DC converter in the form of a boost converter 155 having a voltage input 160 and a voltage output 165, although it will be appreciated that other DC/DC converters with a modulation index (i.e. the ratio of output voltage to input voltage) greater than one can be utilized. The boost converter 155 is operable to increase the value of the input voltage 160 at the output 165. The components of the boost converter 155 are well known to one with ordinary skill in the art and include an input capacitor 170, an output capacitor 175, an inductor 180, a first switch 185 (e.g., a MOSFET), and a second switch 190 (e.g., a diode). By controlling the switch 185, the voltage is controlled from input 160 to output 165. The position of the load switches 140 can be changed in order to connect the input capacitor 170 in parallel with the batteries 75, the super-capacitors 80, both, or neither, as desired. The MOSFET 185 of the boost converter 155 is controllable via a gate signal input 195 provided by the control unit 40. The output capacitor 175 is coupled in parallel to the light source 145 such that the boost converter output 165 provides a voltage to drive the LEDs 150.

Referring to FIG. 2, the housing 15 supports a user interface 200 for controlling the camera assembly 10 and determining the state of the camera assembly 10. The user interface 200 is disposed along the rear side of the camera assembly 10 and has a selector switch 205, button switches 210, a rotary dial 215, and a display 220. The selector switch 205 is a three-position toggle that controls the camera mode (e.g., still image mode, video image mode, and hybrid image mode). The button switches 210 and the rotary dial 215 can be manipulated by the user to control the camera assembly 10, and to obtain information regarding the state of the camera assembly 10 (e.g., adjusting the programmable settings of the camera assembly 10 such as the time interval between images, the time of day, etc.). The settings and the information associated with the camera assembly 10 can be viewed on the display 220. The camera assembly 10 also includes electrical and/or electronic connections (e.g., a USB port 225, a media storage port 230, etc.) to facilitate storage and retrieval of media from the camera assembly 10. As illustrated, a cover 235 is pivotally coupled to the housing 15 to enclose the user interface 200 and the electronic connections (e.g., to protect the user interface 200 from debris, water, sunlight, rain, etc.) when not in use. A fastener 240 secures the cover 235 to the housing 15. As will be appreciated, the camera assembly 10 can include other components (e.g., additional sensors, not specifically discussed herein).

With reference to FIGS. 1, 2 and 4, the control unit 40 is disposed in the housing 15 and is in communication with the camera 20, the detector 25, the illumination assembly 30, the power module 35, and the user interface 200 to control the camera assembly 10. In addition to the control unit 40 controlling the switches 120, 185 of the converters 85, 155 via the gate signals 135, 195, respectively, the control unit 40 also takes voltage measurements 245 from both the illumination assembly 30 and the power module 35 to provide feedback. As shown in FIG. 4, the illustrated measurements can be taken at the SEPIC converter input 90 (which is the same as the battery 75 voltage), and the SEPIC converter output 95 (which is the same as the super-capacitor 80 voltage) in order to monitor the charging of the super-capacitors. It will be appreciated by one of ordinary skill in the art that the measurements 245 taken for feedback to control the SEPIC converter 85 eliminate the conventional current measurements typically needed to adequately control the charging of capacitors or batteries. It will also be appreciated by one of ordinary skill in the art that the SEPIC converter 85 can be controlled by the control unit 40 to operate in constant current mode (CCM) short durations or discontinuous current mode (DCM) when charging the super-capacitors 80. In addition, a voltage measurement 245 is taken in the illumination assembly after the array of LEDs 150. This voltage measurement can be utilized as a measure of the power, and subsequent illumination, being provided by the light source 145.

In operation, the detector 25 triggers the camera 20 to take a picture, start a video, or both (e.g., consecutively or with staggered starts), when the sensor 65 detects and responds to infrared light (or a change in infrared light) or motion within the field of view of the detector 25.

More specifically, the control unit 40 receives information from the sensor 65 and is programmed to actuate the camera 20 when the subject is within the field of view. In response to the signal from the sensor 65, the control unit 40 automatically configures the illumination assembly 30 and power module 35 as needed to illuminate the subject. That is, the control unit 40 controls the illumination assembly 30 and power module 35 so that the light source 145 is providing enough illumination for a high quality picture or video without drastically draining the battery 75 or super-capacitor 80 power.

The control unit 40 determines the camera mode from the selector switch 205 and automatically configures the camera assembly 10 to use the super-capacitors 80, the batteries 75, or both based on the camera mode. In the still image mode, the subject is illuminated using the super-capacitors 80 to drive the light source 145 for a brief period of time (e.g., approximately 0.25 seconds) while the camera captures a still image of the subject. With the super-capacitors 80 charged, the LEDs 150 are driven at a high current provided by the super-capacitors 80, thus producing a high quality image. If only a still photograph is taken by the camera 20, the control unit 40 recharges the super capacitors 80 by utilizing the battery 75 voltage through the SEPIC converter 85. In addition, by supplying the high power flash for the photograph with the super-capacitors 80, the batteries 75 are saved from having to supply the damaging current pulses characteristic of a photograph flash.

In the video image mode, the subject must be illuminated over a longer timeframe to adequately capture a video image of the subject. In this mode, the control unit 40 uses the batteries 75 to provide a longer duration of illumination at a low power level. The control unit 40 allows the LEDs 150 to be driven at a lower current provided by the batteries 75 for the duration of the video (usually at least 10 seconds in length), drastically saving the life of the batteries 75 had they been driven at the high power level provided for the photograph flash.

In the hybrid image mode, the control unit 40 illuminates the subject using the super-capacitors 80 for capturing the still image, and subsequently illuminates the subject using the batteries 75 to capture the video image. The control unit 40 is able to dynamically communicate with the illumination assembly 30 and power module 35 in order to consecutively capture a still image with a high power flash and a video image with low power illumination by controlling the load switches 140.

Various features and advantages of the invention are set forth in the following claims.

What is claimed is:

1. A camera assembly comprising:
    a digital camera;
    a power source including a battery and a super capacitor;
    an illumination element powered by the power source;
    a first converter having a voltage input and a voltage output, the voltage input connected to the battery and the voltage output connected to the super capacitor, wherein the first converter is operable to charge the super capacitor from the battery;
    a second converter having a voltage input and a voltage output, the voltage input connected to the power source and the voltage output connected to the illumination element; and
    a controller programmed to control whether the illumination element is powered by the battery, the super capacitor, or both, and further programmed to control the first converter and the second converter.

2. The camera assembly according to claim 1, wherein the controller measures the voltage of the super capacitor as feedback to control the first converter.

3. The camera assembly according to claim 1, wherein the illumination element is an LED.

4. The camera assembly according to claim 1, wherein the digital camera is a motion-activated scouting camera.

5. The camera assembly according to claim 1, wherein the first converter is a DC/DC SEPIC converter.

6. The camera assembly according to claim 1, wherein the second converter is a DC/DC boost converter.

7. The camera assembly according to claim 1, wherein the power source further includes a load switch controllable by the controller to selectively connect the battery or super capacitor to the second converter.

* * * * *